Feb. 3, 1970  J. E. JACKSON  3,493,888
LASER CRYSTAL SUPPORTING MEANS AND COOLING SYSTEM
Filed June 7, 1966

INVENTOR.
JOHN E. JACKSON
BY
Leo A. Plum, Jr.
ATTORNEY

United States Patent Office 3,493,888
Patented Feb. 3, 1970

3,493,888
LASER CRYSTAL SUPPORTING MEANS AND COOLING SYSTEM
John E. Jackson, Indianapolis, Ind., assignor to Union Carbide Corporation, a corporation of New York
Filed June 7, 1966, Ser. No. 555,780
Int. Cl. H01s 3/04
U.S. Cl. 331—94.5                    12 Claims

ABSTRACT OF THE DISCLOSURE

A device for supporting a laser crystal which includes a cylindrical ring having finger members mounted toward the periphery of the ring which extend generally parallel to the laser crystal. The end of the laser crystal is supported in the aperture formed by the ring and fingers. Cooling fluid can be supplied to the crystal through the channels between finger members.

---

This invention relates generally to laser systems and more particularly to improved means for supporting a laser crystal in a laser device.

In the now well known laser system for effecting light amplification by the stimulated emission of radiation, there is provided a laser material and a light source means for pumping light into the material. The laser material can be a host crystal, for example alpha-alumina or yttrium almuinum oxide, doped with a primary additive to provide the laser ions, e.g. chromium in the case of the alumina or neodymium in the case of the yttrium aluminum oxide.

The considerable amount of energy input to the laser crystal required to achieve laser action causes temperature buildup in the crystal and the resulting thermal stresses can cause physical deterioration of the crystal body. These dangerous conditions exist in regard to the laser crystals in both the pulse laser system and the continuous wave laser system wherein the laser device is continuously being pumped and emitting radiation.

It is the primary object of this invention therefore to provide means for supporting a laser crystal in a laser device to allow more effective cooling of the laser crystal to prevent buildup of thermal stresses therein as well as to provide means for reducing the effects of thermal stresses.

It is a further object of this invention to particularly provide means for supporting and cooling the laser crystal of a continuous wave laser system.

It is also an object of this invention to provide means for contacting a laser crystal with a fluid medium for such purposes as may be desired.

Other aims and advantages of this invention will be apparent from the following description, the claims appended hereto and the accompanying drawing.

In accordance with these objects a crystal supporting means is provided comprising, in combination, an elongated, cylindrical laser crystal, an elongated transparent tube having a greater inside diameter than the outer diameter of the laser crystal and in surrounding relationship with said laser crystal, support means at each end of the laser crystal comprising a short cylindrical ring member slideably fitting inside the transparent tube, finger members mounted on the inner walls of the ring member and projecting partially inward forming a spider assembly having a central aperture for receiving an end of the laser crystal for supporting said laser crystal within the transparent tube and coaxial therewith with an annular space between the laser crystal and the inner walls of the transparent tube.

The above described supporting means allows efficient cooling of the laser crystal by passing coolant fluid through the transparent tube and around the laser crystal. The fluid can flow into one end of the tube, through the openings between the finger members mounted on the supporting members and thence into cooling contact with the end face and sides of the laser crystal. The fluid exits from the opposite end of the tube. It is to be noted that any fluid, liquid or gaseous, can be passed through the tube for enveloping or contacting a laser crystal, whether for cooling or for any other purpose.

The invention also includes laser systems provided with the crystal supporting and fluid contacting means of this invention, including a housing having a chamber therein, a transparent tube spanning the chamber with its ends supported at opposite walls of the housing defining the chamber, an elongated, cylindrical doped laser crystal of a smaller outer diameter than the inner diameter of the transparent tube, said laser crystal supported in the tube by supporting means situated at each end of the laser crystal, each supporting means comprising a short cylindrical ring member slideably fitting inside the transparent tube, finger members on the ring member projecting partially inward forming a spider assembly having a central aperture for receiving an end of the laser crystal for supporting, along with said other supporting member, the laser crystal within the transparent tube and coaxial therewith with an annular space between the laser crystal and the inner walls of the transparent tube, end members associated with said laser crystal exhibiting high reflectance defining an optical cavity therein, a source of exciting energy within said chamber optically coupled to said laser crystal for effecting an inverted population state therein, means for passing a fluid medium through said transparent tube and around said laser crystal, and means for extracting output radiative energy from said laser crystal.

The invention further includes the supporting member having a spider arrangement for holding the end of a laser crystal.

The crystal supporting arrangement of the present invention may be utilized in various types of laser systems. For the purpose of illustrating the invention, a description of its use is given in regard to a particularly valuable laser system having an elliptical generator geometry and a continuous wave mode of operation. The application of the invention is not limited to such a system, but also includes other laser systems, as hereinafter explained.

Figures 1, 2, 3:
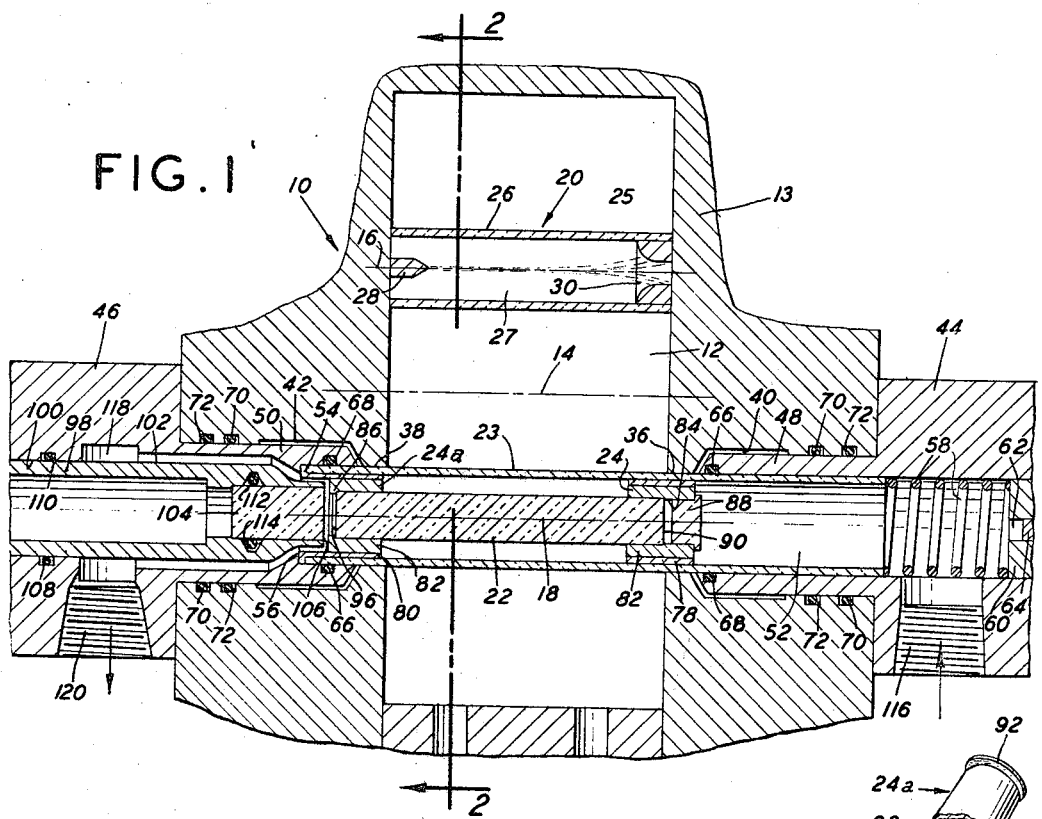
FIGURE 1 is a longitudinally cross section of a portion of a laser system showing a laser crystal supported by the arrangement of this invention and its usage in a laser device.
FIGURE 2 is a transverse cross sectional view of the laser system of FIGURE 1 taken along lone 2—2.
FIGURE 3 is a perspective view of a cored laser crystal, held at one end in a spired device of this invention, also shown in FIGURES 1 and 2.

Referring to FIGURES 1 and 2, a portion of a laser system 10 is shown generally with an elliptical chamber 12 formed in a housing 13 and having a longitudinal axis 14 and two focal axes 16 and 18 parallel to the longitudinal axis. A source 20 of exciting or pumping energy is positioned in parallel relationship with the longitudinal axis and coaxial with the focal axis 16. An elongated, cylindrical doped laser crystal 22 is positioned in parallel relationship with the longitudinal axis and coaxial with the other focal axis 18.

The laser crystal is surrounded by a transparent envelope or tube 23 and is supported therein by the spider members 24 and 24a which are cylindrical members having an outer diameter just large enough to slideably or snugly fit in the tube 23, as hereinafter set forth. The diameter of the aperture formed by the spider is such as to support without restraining the laser crystal whereby any expansion due to thermal conditions may be relieved. Additionally the open nature of the spider supports allows for a flow of coolant around the laser crystal to remove heat therefrom.

The use and advantages of this invention are best understood by further reference to specific laser systems. Referring again to FIGURES 1 and 2, the energy source in embodiment shown is a stabilized high pressure arc 25 operating within a transparent envelope 26 as a line radiation source. The arc producing means may comprise a cathode 28 and an anode nozzle 30 in spaced axial alignment therewith. The transparent envelope 26 forms an arc chamebr 27. The arc 25 is formed by connecting a suitable power supply to the electrodes and supplying a flow of arc gas, such as argon, through inlets (not shown) near the nozzle 30 for injection into the arc chamber 27 in a swirling pattern. The arc gas flows along the inner face of the envelope 26 toward the cathode where the direction of flow reverses to travel toward and out the nozzle 30. The arc may be initiated by a high frequency discharge and is stabilized and constricted by the swirling gas flow.

The radiation generated by the arm 25, located at the focal axis 16, is directed and concentrated on the laser crystal 22 located at the other focal axis 18. The walls 32 of the elliptical chamber are highly polished to effect this optical coupling of the line radiation source and the laser crystal. In forming the arc 25, other types and arrangements of anodes and cathodes may be used.

Additionally, it is to be understood that other than elliptical chambers may be used. For example chambers having parabolic, hyperbolic or other curved surfaces can be used provided only that the pumping energy source located in the chamber is optically or otherwise coupled to the laser crystal. Additionally the pumping energy source can be other than an arc and can comprise one or more lamps, preferably elongated lamps arranged on or about the focal axis, or any other type of pumping source.

Another laser system in which the laser crystal supporting means of this invention can be used is a cylindrical chamber, having polished interior walls, with an elongated laser crystal positioned coaxial with the longitudinal axis of the cylindrical cavity. A number of elongated lamps are positioned inside the cylindrical chamber parallel to the laser crystal and surrounding it; or a helical lamp may be positioned inside the cylindrical chamber in surrounding relationship to the centrally positioned laser crystal. The laser crystal supporting means of this invention can be used in any other type of laser system. It is only necessary that there is a chamber, with an exciting or pumping energy source associated with a laser crystal and coupled to the laser crystal for excitation thereof to produce a stimulated emission of energy and that there is a need for means to support the laser crystal in the chamber.

As previously stated, the laser crystal is advantageously supported by the transparent envelope or tube 23. The envelope itself is supported in closely fitting openings or bores 36 and 38 formed in the walls of the block 13. These openings are counterbored to a larger diameter at 40 and 42. Support members 44 and 46, clamped to the housing 13 by bolts (not shown), have tubular end portions 48 and 50 of lesser diameter extending into the counterbores 40 and 42. These end portions have longitudinally extending bore holes 52 and 54 into which the ends of the tube are slideably fitted. One end of the tube is seated inside the bore hole 54 near a shoulder 56 and the other end of the tube is resiliently held in place by a restraining spring 58 seated against an insert 60 threadably secured in the outer end of the borehole 52. The insert 60 may have an opening 62, closed by a removable plug 64, to allow access to the interior. The spring 58 serves to compensate for any expansion and contraction of the tube 23. Flexible O ring members 66 held in annular slots 68 in the walls of the boreholes 52 and 54 further hold the tube and form a fluid tight seal therewith. Another set of O ring members 70 held in annular slots 72 formed in the outer walls of tubular end portions 48 and 50 serve to form fluid tight seals between these members and the walls counterbore 40 and 42 in which they fit.

The laser crystal 22 is itself supported in the tube 23 by means of suitable support members or spiders 24 and 24a located at each end of the elongated crystal body. The spiders 24 and 24a each comprise ring shaped outer structures 78 and 80 having an outside diameter affording a snug but slideable fit inside the tube 23. A series of finger projections 82 are spaced around and attached to the inner walls of the ring members and extend radially inward to form a loosely fitting spider-shaped holder for the ends of the cylindrical crystal body. Each series of fingers have annular shoulder portions 84 and 86 which are fit around the respective ends of the crystal body. In one of the spider members 24, a plug 88 is fitted inside the end portion of the opening formed by the fingers 82. The plug thus shields the end face 90 of the crystal but is separated from said face and does not impede flow of coolant to said end face. This is particularly useful when using a laser crystal having a central core along its longitudinal axis, whereby coolant may pass through the openings between the fingers 82 and into the core for cooling of the laser crystal.

The spider member 24a at the other end of the crystal has an annularly shaped flange portion 92 formed on the end of the ring 80. This flange snugly fits inside the borehole 54 abutting the shoulder 56 therein and encircling the end of the tube 23.

The crystal 22 is arranged in its support members in the tube 23 with a totally reflective end face 90 situated adjacent the plug 88. The opposite end face 96 is only partially reflective so that the emitted radiation may leave the crystal. Radiation extracting means are situated in the bore hole 54 as follows: a tubular member 98 is fitted in a smaller diameter end portion 100 of the bore hole 54 so that the tube 98 can freely extend coaxially into the main bore hole section 54 leaving an annular channel 102 between the tube 98 and the walls of this portion of the bore hole. A transparent cylinder 104 is fitted in the end of the tube 98 with an end face 106 parallel to the end face 96 of crystal 22 and spaced slightly apart therefrom so as to receive emitted radiation from the crystal for transmission through the transparent cylinder 104 or light pipe and out through the tube 98 to a point of use. A flexible O ring member 108 held in an annular slot 110 in the walls of the end portion of the bore hole 54 forms a fluid tight seal with the tube 98. Another flexible O ring 112 held in an annular slot 114 in the inner walls of the tube 98 forms a fluid tight seal between the tube and the transparent cylinder 104.

In operation, coolant fluid is admitted to an inlet 116 in the member 44 for flow through the borehole 52 and into the tube 23. The coolant fluid then flows through tube 23 around the crystal to the opposite end of the tube 23, through the channels between fingers 82 and into the annular channel 102 to an annular space 118 formed in the walls of the end member 46 and thence out an outlet 120. The O ring seals 66, 72, 108 and 112 prevent the escape of coolant fluid to the chamber 12, the counter bores 40 and 42, or the tube 98. A suitable coolant supply means may be connected to the inlet 116 and a coolant receiving means may be connected to the outlet 120.

The plug 88 shields the end face 90 of the laser crystal from abrasion by a high velocity flow of coolant coming from the inlet 116 through the bore hole 52 into the transparent tube in the vicinity of the end face 90.

The spider supports 24 and 24a are loosely fitted around the ends of the laser crystal so as to allow for relief of any thermal stresses in the crystal by expansion, Additionally the spider 24 is only slideably fitted in the tube 23 so that longitudinal movement of the spider and the crystal supported therein is possible, thereby providing for longitudinal movement of the crystal to relieve stresses.

The coolant fluid utilized may be any liquid or gas having the requisite cooling properties in addition to the necessary optical suitability. Distilled water is a convenient coolant in the case of a laser system requiring only the removal of that amount of heat generated in operation of the device (tap water may also be used).

In those laser systems where the cavity must be refrigerated to a very low temperature, as required with many laser materials, then refrigerated gases or liquefied gases, as required, may be employed. It is to be understood therefore that the temperature control may be for the purposes of cooling, refrigerating or maintaining any low or high temperature as may be desired.

The fluid used in the laser system may have a second function in regard to absorbing undesirable radiation from the energy source or this may be the primary function of the fluid passed through the coolant system. Suitable fluids for these purposes include sodium chromate and sodium nitrate solutions which absorb ultraviolet rays. These solutions can function as coolant mediums.

The transparent envelopes 23 and 26 as well as the cylinder 104 may be formed of a heat resistant glass, such as quartz, pyrex, or any other suitable material.

The end faces of the cored crystal are generally optically flat and parallel, as is common to such devices although any other type end face may be accommodated in the supporting means of this invention. These ends are properly oriented in regard to the length of the crystal as is known in the art to provide the desired oscillations when provided with reflective end coatings. In regard to the laser generator described herein, one end face 90 is coated for full reflectivity and the other end face 96 only partially reflective to provide a means for the removal of output radiative energy. It is to be understood that this invention includes laser crystals which have any manner of regenerative end faces, mirrors or other means for effecting laser action and is not limited to the type devices shown and described herein for illustrating the cored laser crystal of this invention.

The crystal supporting means of this invention can be advantageously used with the cored laser crystal as set forth in my copending application Ser. No. 555,779 filed June 7, 1966. The crystal described therein has a cored section extending along its longitudinal axis which forms a passage for the flow of coolant through the laser crystal itself as well as through the tube 23 and around the exterior of the crystal. The coolant fluid entering the inlet 116 flows through the borehole 52 and into the tube 23. A portion of this field passes around the plug 88 and between the fingers 82 onto the face 90 of the crystal. If there is a cored section in the crystal, this portion of the coolant will flow into said passage and through the crystal to the opposite end. The major portion of the coolant flows through the tube 23 around the crystal and to the opposite end of the tube where it is rejoined by the portion of coolant exiting from the cored section of the crystal which flows out of the crystal and between the fingers 82. The two flows of coolant then flow into the annular channel 102 and into the annular space 118 for flow out the outlet 120.

As an example of the practice of the invention a cylindrical ¼" O.D. yttrium aluminum garnet crystal (YAG) doped with neodymium to provide neodymium ions ($Nd^{3+}$) and about one and three quarters inches long was cored to form a ⅛" hole along the longitudinal axis of the crystal. The surface of the hole was smooth but unpolished and translucent. This cored laser crystal was supported in a ⁷⁄₁₆" I.D. quartz tube in a laser system similar to that described herein. Water was used to cool the crystal at flow rates amounting to 16 gallons per minute through the tube and 1 gallon per minute through the cored section of the laser crystal, or 17 gallons per minute in all.

An arc radiation source was used to pump the crystal into a continuous wave mode of operation. The arc source was operated at currents from 116 to 225 amperes with voltages from 230 to 255 volts. The laser crystal was lased with up to 14 watts of output energy with no damage to the crystal. Previous operations of the same laser system using a solid ⅛" O.D. crystal resulted in severe cracking of the crystal at currents of about 200 amperes. The thermal gradients could be expected to increase with the increased crystal diameter of the cored crystal, but the more effective cooling possible with the cored crystal allowed its use. The very effective cooling of the laser crystal, both internally and externally, was made possible by the use of the supporting means of this invention which provided unrestrained, stress-relieving support for the crystal and also allowed a flow of coolant to contact all surfaces of the laser crystal.

While this invention has been described in terms of specific laser systems and in particular for use with a cored laser crystal, it is to be understood that this invention is applicable to all types of laser systems and all types of laser crystals, cored as well as solid.

What is claimed is:

1. A laser crystal supporting means for use in a laser device comprising, an elongated, cylindrical laser crystal, an elongated transparent tube having a greater inside diameter than the outer diameter of the laser crystal and in surrounding relationship with said laser crystal, support means at each end of the laser crystal comprising a short cylindrical ring member slidably fitting inside the transparent tube, finger members mounted toward the periphery of said ring member and projecting partially inward and generally parallel to said laser crystal forming a spider assembly having a central cylindrical aperture formed by said ring and said fingers for receiving an end of the laser crystal for supporting said laser crystal within the transparent tube and coaxial therewith with an annular space between the laser crystal and the inner walls of the transparent tube.

2. A supporting means as in claim 1 in which the finger members are mounted on the inner walls of the ring member.

3. A supporting means as in claim 1 in which the finger members are thin rectangular members connected to the innner walls of the ring member at one long, thin edge thereof.

4. An improved laser system comprising, in combination a housing having a chamber therein, a transparent tube spanning the chamber with its ends supported at opposite walls of the housing defining the chamber, an elongated, cylindrical, doped laser crystal of a smaller overall diameter than the inner diameter of the transparent tube, said laser crystal supported in the tube by supporting means situated at each end of the laser crystal, each supporting means comprising a short cylindrical ring member slideably fitting inside the transparent tube, finger members mounted toward the periphery of said ring member projecting partially inward and generally parallel to said laser crystal forming a spider assembly having a central cylindrical aperture formed by said ring and said fingers for receiving an end of the laser crystal for supporting, along with said other supporting member, the laser crystal within the transparent tube and coaxial therewith with an annular space between the laser crystal and the inner walls of the transparent tube, the outside surface of said laser crystal, the inner wall of said tube and each adjacent pair of said fingers defining a channel communicating with said annular space, end members associated with siad laser crystal exhibiting high reflectance defining an optical cavity therein, a source of exciting energy within said chamber optically coupled to said laser crystal for effecting an inverted population state therein, means for passing a fluid medium through said channels and said transparent tube and around said laser crystal, and means for extracting output radiative energy from said laser crystal.

5. A laser system as in claim 4 in which the end portions of the transparent tube are fitted in circular bore holes formed in opposite end walls of the chamber, said end portions of the tube extending a distance into their respective bore holes, and in which said means for passing a fluid medium includes a fluid inlet and an outlet situated in said housing and communicating with said bore holes for passing fluid through one of said bore holes into the transparent tube for flow through said tube around the laser crystal and then out of the other end of said tube into the other bore hole for discharge through the outlet.

6. A laser system as in claim 5 in which the end faces of the laser crystal are shielded from a high velocity flow of fluid tending to abrade reflective coatings on said faces by members positioned adjacent each such crystal end face but separated therefrom allowing substantially only sidewards flow of fluid in the vicinity of said end faces.

7. A laser system as in claim 6 in which a tubular member of a lesser diameter than said transparent tube projects into and is supported coaxially within an end portion of the transparent tube forming an annular fluid passage with the inner walls of the end portion of the transparent tube, a cylindrical transparent light pipe member supported in a fluid tight engagement in the projecting end of said tubular member with the outer end face of the cylinder member parallel to and slightly spaced apart from a partially reflective end face of the laser crystal whereby radiative energy output from the crystal when lased can pass through the transparent cylindrical member and through the tubular member to a point of use.

8. A laser system as in claim 7 in which the opposite end face of the laser crystal is shielded from a high velocity flow of fluid by a member positioned adjacent and slightly spaced apart from said face, said member supported by the crystal supporting member in the aperture formed by the finger members thereof at their ends opposite the crystal receiving ends of said finger members.

9. A laser system as in claim 8 in which the chamber in the housing has a longitudinal axis and a curved cross section in a plane perpendicular to said longitudinal axis, and in which the laser crystals and the energy source are supported in said chamber with their longitudinal axes parallel to the longitudinal axis of the chamber.

10. A laser system as in claim 9 in which the chamber has a circular cross section and the laser crystal is supported with its longitudinal axis coincident with the longitudinal axis of the chamber, and in which the energy source is arranged around the laser crystal.

11. A laser system as in claim 8 in which the chamber in the housing has a longitudinal axis and an elliptical cross section in the plane perpendicular to the longitudinal axis, and in which the laser crystal is supported with its longitudinal axis coincident with one of the longitudinal focal axis of the elliptical chamber and in which the energy source is elongated with its longitudinal axis coincident with the other longitudinal focal axis of the elliptical chamber.

12. A laser system as in claim 11 in which the energy source is an elongated arc maintained in a transparent tube struck between an anode and a cathode, said arc being constricted and stabilized by a swirling flow of arc-supporting gas in said tube.

References Cited
UNITED STATES PATENTS 3,210,687   10/1965   Boyd et al.   331—94.5
3,361,989   1/1968   Sirons   331—94.5

SIEGFRIED H. GRIMM, Primary Examiner

ROY LAKE, Assistant Examiner

U.S. Cl. X.R.

330—4.3